US006970929B2

(12) United States Patent
Bae et al.

(10) Patent No.: US 6,970,929 B2
(45) Date of Patent: Nov. 29, 2005

(54) VECTOR-BASED, CLUSTERING WEB GEOGRAPHIC INFORMATION SYSTEM AND CONTROL METHOD THEREOF

(75) Inventors: Hae-Young Bae, Inchon (KR); Young-Whan Oh, Inchon (KR); Chung-Ho Lee, Inchon (KR)

(73) Assignee: Inha University Foundation, Inchon (KR)

( * ) Notice: Subject to any disclaimer, the term of this patent is extended or adjusted under 35 U.S.C. 154(b) by 706 days.

(21) Appl. No.: 10/170,894

(22) Filed: Jun. 12, 2002

(65) Prior Publication Data

US 2003/0233403 A1 Dec. 18, 2003

(51) Int. Cl.[7] .............................................. G06F 15/173

(52) U.S. Cl. ...................... 709/226; 709/203; 709/225; 709/229; 709/239; 718/104; 718/105; 707/1; 707/3; 707/10; 707/104.1

(58) Field of Search ................................ 709/203, 225, 709/226, 229, 235; 718/104, 105; 707/1, 707/3, 10, 104.1

(56) References Cited

U.S. PATENT DOCUMENTS

| | | | | |
|---|---|---|---|---|
| 6,484,204 | B1 * | 11/2002 | Rabinovich | 709/226 |
| 6,832,253 | B1 * | 12/2004 | Auerbach | 709/226 |
| 2005/0033716 | A1 * | 2/2005 | Ambroz et al. | 707/1 |

OTHER PUBLICATIONS

An article entitled "Exploiting Spatial Locality in Data Caches Using Spatial Footprints", By Sanjeev Kumar et al., (1998) pp. 357-368.

An article entitled "The ArcIMS 3 Architecture", Jun. 2000, pp. 1-23.

An article entitled "System Design Strategies" By Dave Peters, Jul. 2001.

* cited by examiner

*Primary Examiner*—Ario Etienne
*Assistant Examiner*—Yves Dalencourt
(74) *Attorney, Agent, or Firm*—Bachman & LaPointe, P.C.

(57) ABSTRACT

A vector-based system maximizes the performance of a server of a clustering Web geographic information system by realizing efficient load balancing using a load balancing processor, thus improving the system's reliability and stability. A control method of the system minimizes a user response time by using a progressive transmission technique when transmitting vector data.

7 Claims, 6 Drawing Sheets

VECTOR-BASED, CLUSTERING WEB GEOGRAPHIC INFORMATION SYSTEM AND CONTROL METHOD THEREOF

BACKGROUND OF THE INVENTION

1. Field of the Invention

The present invention relates generally to clustering Web geographic information systems, and more particularly, to a vector-based system and a control method thereof, which can maximize the performance of a server using efficient load balancing in a Web geographic information system and which can minimize user response time using a progressive transmission technique when transmitting vector data.

2. Discussion of the Related Art

Web geographic information systems are classified into vector-based systems and image-based (raster-based) systems, and the present invention is notably directed to the former rather than the latter. A vector-based system is achieved using a method whereby a single server processes the queries requested by clients, constructs result data to be transmitted, and compresses and transmits the constructed data. If several servers process the queries, the queries are distributed and processed using a simple round-robin method.

While an image-based system typically employs a Web server cluster to solve the problem of service interruption due to excessive workloads, as in the event of an unexpected increase in the number of users of a Web site providing geographic information, a vector-based system cannot solve such service interruption problems in this clustering method on Web server level. Since there is no consideration of the locality of spatial queries in the distribution of loads using the above-mentioned round-robin method, efficient load balancing cannot be achieved in a clustering server system of a Web geographic information system. Further, in transmitting result data, the amount of vector data is excessive unlike normal image and text data, such that the transmission is overly time-consuming and thus inconvenient to the user.

SUMMARY OF THE INVENTION

Accordingly, the present invention has been made keeping in mind the above problems.

It is an object of the present invention to improve the reliability and stability of a clustering Web geographic information system.

It is another object of the present invention to maximize the performance of a server in a clustering Web geographic information system by realizing efficient load balancing using a load balancing processor.

It is yet another object of the present invention to minimize a user response time in a vector-based clustering Web geographic information system when transmitting vector data by using a progressive transmission technique.

In order to accomplish the above object, the present invention provides a vector-based, clustering Web geographic information system, comprising at least one client for downloading a Web page through a Web browser, receiving vector data as a result by communicating with a corresponding process like a control server or an applet server via HTTP, and displaying the received vector data; a Web server for receiving spatial queries from an object in the downloaded Web page; a load balancing processor for receiving the spatial queries from the Web server, partitioning a complete region into uniform, tile-based regions using spatial locality, assigning the partitioned regions to respective GIS servers, allowing one GIS server to process queries for a certain region, and dynamically reallocating GIS servers for processing the queries by checking query processing regions and query processing frequencies of respective GIS servers so as to prevent the concentration of queries on one GIS server; a progressive transmission processor for extracting feature points of respective objects in vector data received from GIS servers so as to minimize a user response time, transmitting the extracted features to the client through the Web server, and then transmitting the vector data; a clustering device for improving performance by dividing service requests from the clients among GIS servers; a plurality of GIS servers each having a GIS engine, for processing the spatial queries, producing and outputting vector data; and a spatial/non-spatial database for providing data to the GIS servers, managing complete data using tile based indexes, and constituting a local duplicate database in each GIS server to prevent central bottlenecking.

Further, the present invention provides a control method of a vector-based, clustering Web geographic information system, comprising steps of (a) downloading a Web page through a Web browser, running a map service process like a control (GeoWebx) or an applet (GeoApplete), and transmitting a spatial query to a Web server; (b) transferring the query to a load balancing processor and allowing the load balancing processor to transfer the query to a GIS server selected by a predetermined process; (c) processing the query and transmitting the processed result of vector data to a progressive transmission processor by the selected GIS server; and (d) extracting feature points of respective objects in the result and transmitting the extracted feature points to the client through a predetermined progressive transmission process so as to minimize a user response time, before transmitting the result to the client.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF REFERENCE NUMERALS

Figure 1:
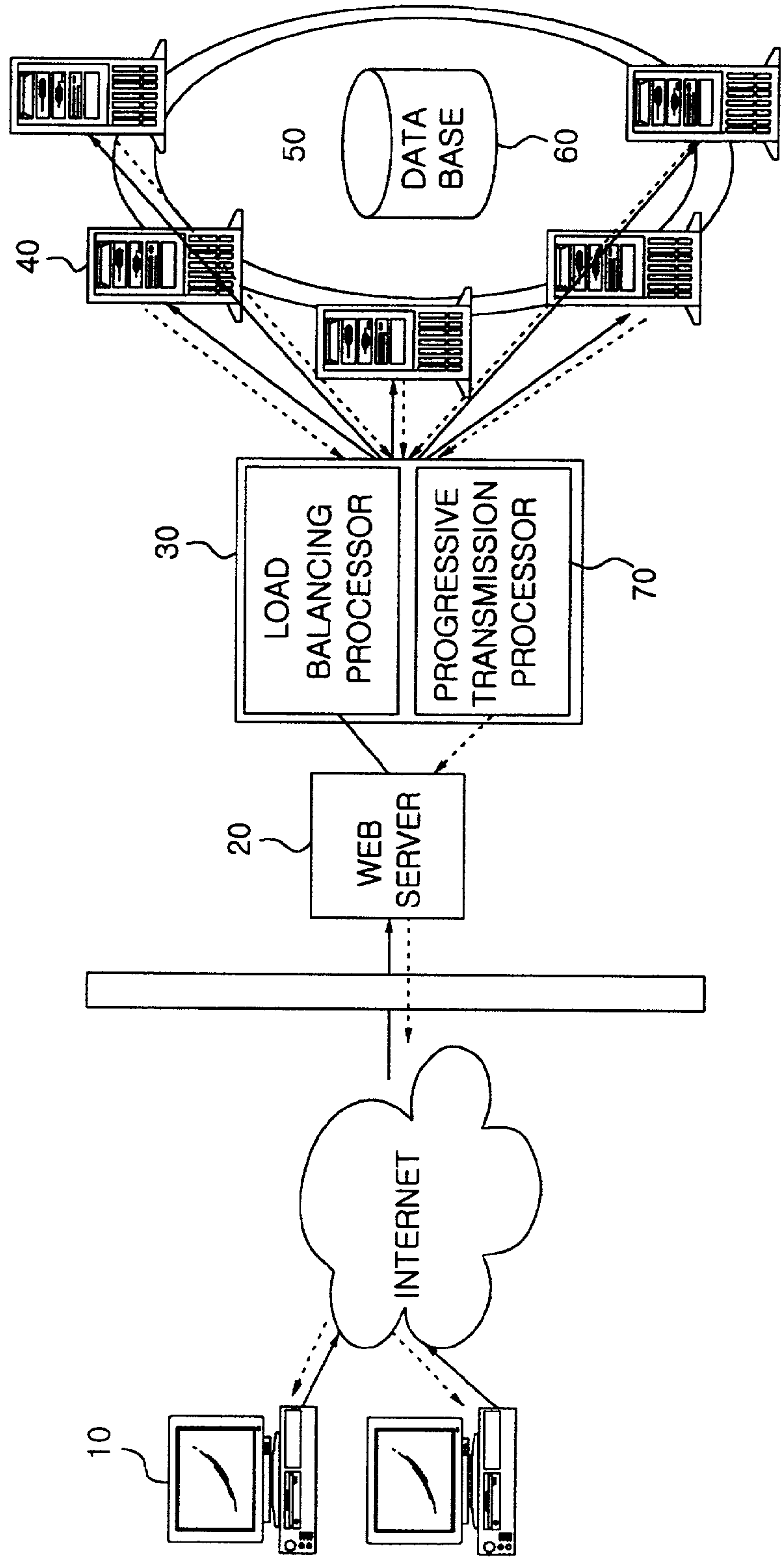
FIG. 1 illustrates the architecture of a vector-based, clustering Web geographic information system according to the present invention.

10: client
20: Web server
30: load balancing processor
31: query region extractor
32: spatial query dispatcher
33: statistical information managing device

34: query processing region partitioner
35: query request redirector
40: GIS server
50: clustering device
60: database
70: progressive transmission processor

DESCRIPTION OF THE PREFERRED EMBODIMENTS

Hereinafter, preferred embodiments of the present invention will be described in detail with reference to the attached drawings.

FIG. 1 illustrates the architecture of a vector-based, clustering Web geographic information system according to the present invention. The system of FIG. 1 comprises at least one client 10, a Web server 20, a load balancing processor 30, a progressive transmission processor 70, a clustering device 50, a plurality of geographic information system (GIS) servers 40, and a spatial/non-spatial database 60.

The client 10 downloads a Web page from the Web server through a Web browser, receives vector data of a region requested by a user by communicating with a corresponding control server or an applet server using a hypertext transfer protocol (HTTP), and displays the received data on a screen. The Web server 20 transmits all spatial queries received from an object downloaded to the client 10 to the load balancing processor 30.

The load balancing processor 30 receives the spatial queries from the Web server 20, partitions an entire region into uniform, tile-based regions based on spatial locality, assigns the partitioned regions to each GIS server 40, and allows one GIS server to process queries for a certain region. To prevent the concentration of queries on one GIS server 40, the load balancing processor 30 dynamically readjusts GIS servers for processing the queries by checking the query processing regions and query processing frequencies of each GIS server.

To minimize a user response time, the progressive transmission processor 70 extracts feature points of respective objects and transmits the extracted features to the client 10 through the Web server 20, before transmitting vector data processed by the GIS servers 40. The clustering device 50 improves processing performance by dividing among the GIS servers 40 service requests from respective clients 10. Each GIS server 40 has a GIS engine for processing spatial queries with reference to inputted data, receives and processes spatial queries of the client 10 from the load balancing processor 30, and transmits processed results to the progressive transmission processor 70. The spatial/non-spatial database 60 provides data to the GIS servers 40, manages complete data using tile-based indexes, and constitutes a local duplicate database in each GIS server 40 to prevent central bottlenecking.

Figure 2:
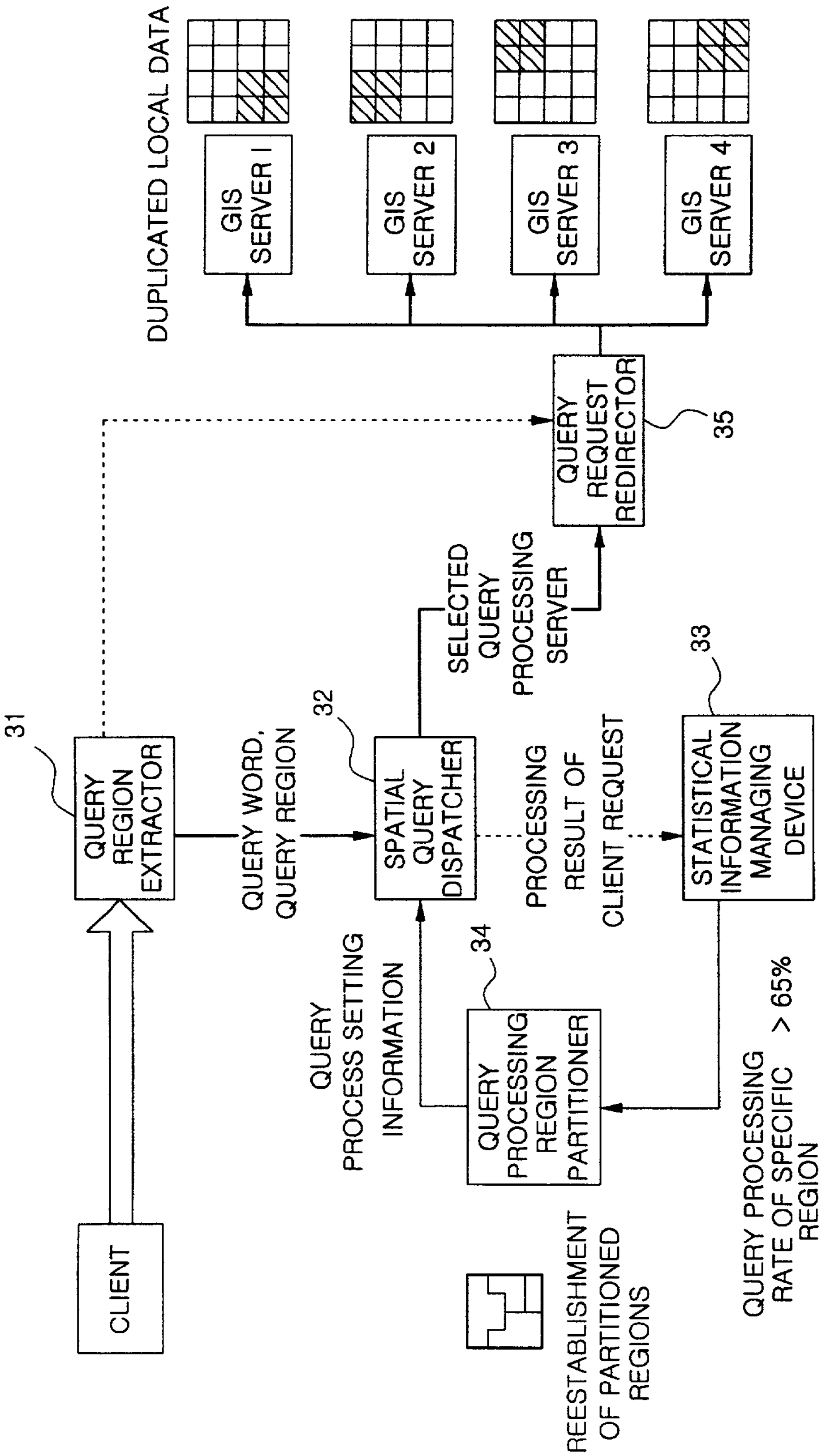
FIG. 2 is a block diagram of the load balancing processor of FIG. 1.

As shown in FIG. 2, the load balancing processor 30 comprises a query region extractor 31, a spatial query dispatcher 32, a statistical information managing device 33, a query processing region partitioner 34, and a query request redirector 35. The query region extractor 31 extracts a spatial operator, a layer, and a query region from a URL based query form requested by the client 10. The spatial query dispatcher 32 classifies a spatial query transmitted from the query region extractor 31 using a query class table, determines a GIS server for processing the spatial query on the basis of tiles, which correspond to query regions, and then transmits the query request. The statistical information managing device 33 manages meta-information for calculating the load concentration rate of each GIS server 40, which is the basis for dynamic partitioning. The query processing region partitioner 34 separately performs a static partitioning operation and a dynamic partitioning operation. The static partitioning operation partitions complete data into a plurality of tiles, calculates Hilbert values for the partitioned tiles, sorts the tiles according to the Hilbert values, and then divides the sorted tiles by the number of GIS servers. The dynamic partitioning operation calculates a weight rate based on a region managed by each GIS server 40 and the number of real query processing times, and reestablishes partitioned regions if the weight rate is greater than or equal to a predetermined percentage. The query request redirector 35 transmits the query to a corresponding GIS server on the basis of the query and an address of the GIS server determined for processing the query, received from the spatial query dispatcher 32.

Hereinafter, an operating process of the vector-based, clustering Web geographic information system having the above construction according to a preferred embodiment of the present invention is described in detail.

Figure 3:
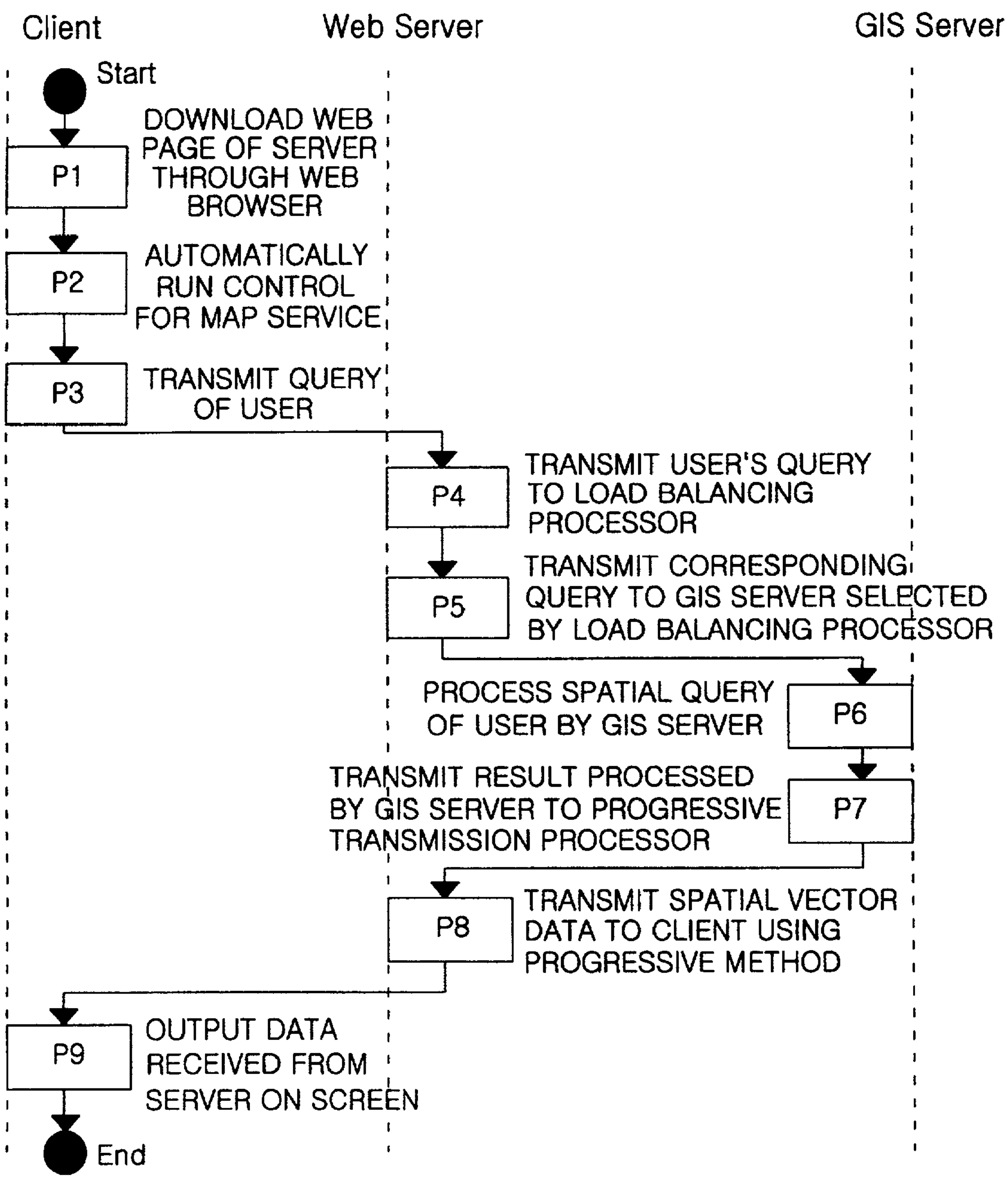
FIG. 3 is a flow chart illustrating an example of the operation of the vector-based, clustering Web geographic information system according to the present invention.

FIG. 3 illustrates an example of the operation of the vector-based, clustering Web geographic information system according to the present invention. As shown in FIG. 3, after downloading a Web page of the Web server 20 through a Web browser, the client 10 runs a map service process like a control (GeoWebx) or an applet (GeoApplet), and transmits a query. Then, the Web server 20 receives the transmitted query and transfers the query to the load balancing processor 30.

Figure 4:
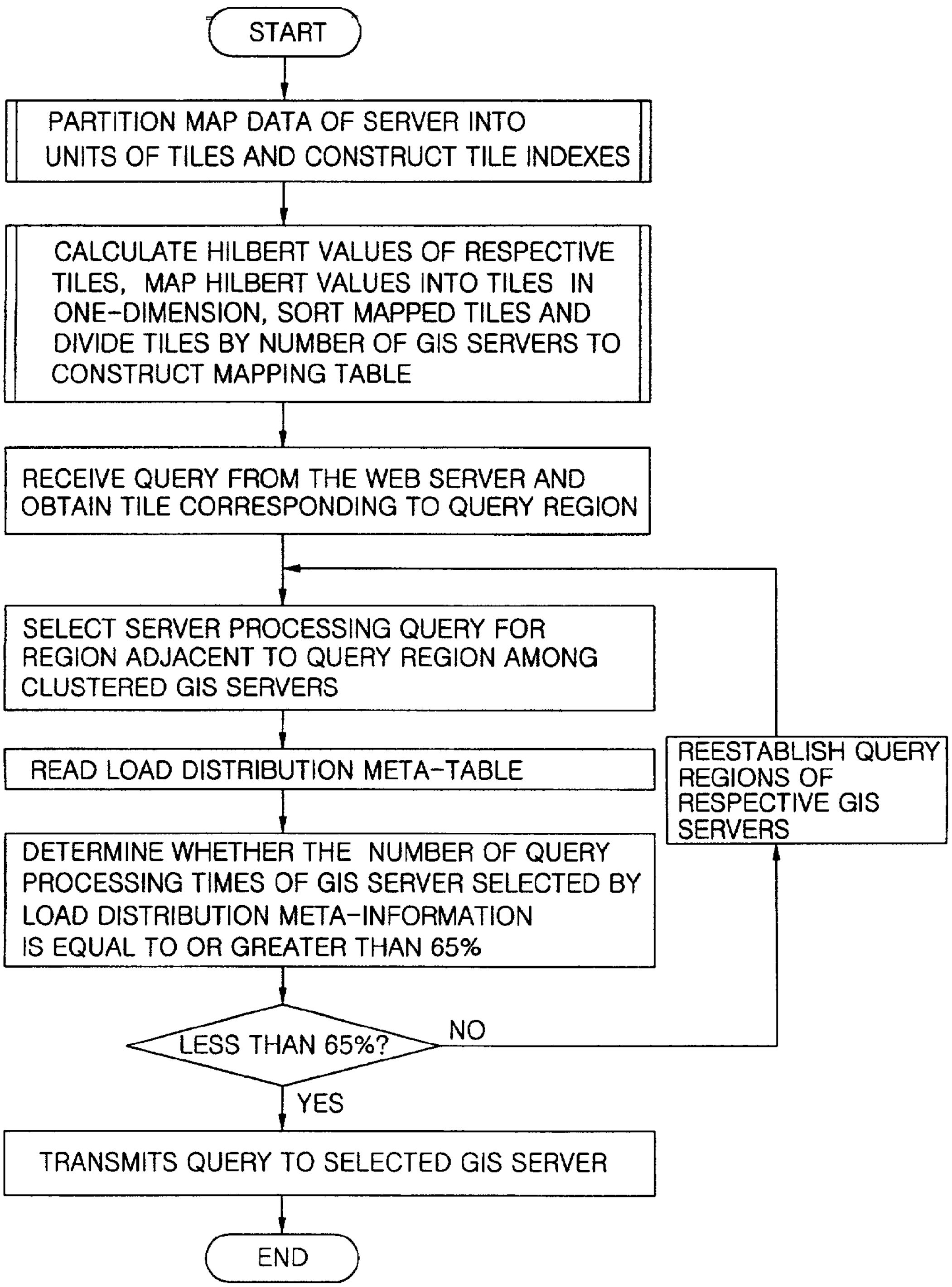
FIG. 4 is a flow chart illustrating an example of the operation of the load balancing processor of FIG. 1.

In this case, with reference to FIGS. 2 and 4, when the query region extractor 31 extracts a spatial operator, a layer, and a query region from a uniform resource locator (URL) based query form requested by the client 10, the spatial query dispatcher 32 of the load balancing processor 30 receives the things extracted. Then, the spatial query dispatcher 32 receives query process setting information from the query processing region partitioner 34, classifies the spatial query using a query class table (not shown) to construct tile indexes, determines a GIS server 40 for processing a query from the tiles, which correspond to query regions, and transmits the determined result to the query request redirector 35. The query request redirector 35 transmits the query to a corresponding GIS server 40 on the basis of the received query and the address of the determined GIS server. The query processing region partitioner 34 partitions a query processing region by way of static partitioning initially and dynamic partitioning during the processing of a query. In this case, the static partition is first performed. That is, the static partition is performed such that complete data are partitioned into tiles, Hilbert values of the partitioned tiles are calculated, the calculated Hilbert values are mapped into tiles in one dimension sequentially, the tiles are sorted, the sorted tiles are divided by the number of the GIS servers to form groups, and the groups are transmitted to the spatial query dispatcher 32. Then, if meta-information inputted through the statistical information managing device 33, that is, a weight rate based on a region managed by each of the GIS servers 40 and the number of real query processing times is greater than or equal to a predetermined percentage (for example, 65%), the partitioned regions are reestablished. In this case, the statistical information managing device 33 manages meta-information for calculating the load concentration rate of each GIS server 40, which is the basis for dynamic partitioning. The meta-information contains regions of tiles assigned to respective GIS servers 40, query processing rates, and weights of the tiles, and is extracted from all processed queries and stored as statistical information.

Then, the selected GIS server 40 processes the spatial query of the user and transmits the processed result to the progressive transmission processor 70. In this case, the clustering device 50 improves processing performance by dividing service requests from respective clients 10 among the GIS servers 40. The spatial/non-spatial database 60 manages complete data using tile-based indexes while providing data to the GIS servers 40. The spatial/non-spatial database 60 constitutes a local duplicate database in each GIS server 40 to prevent central bottlenecking.

Figure 5:
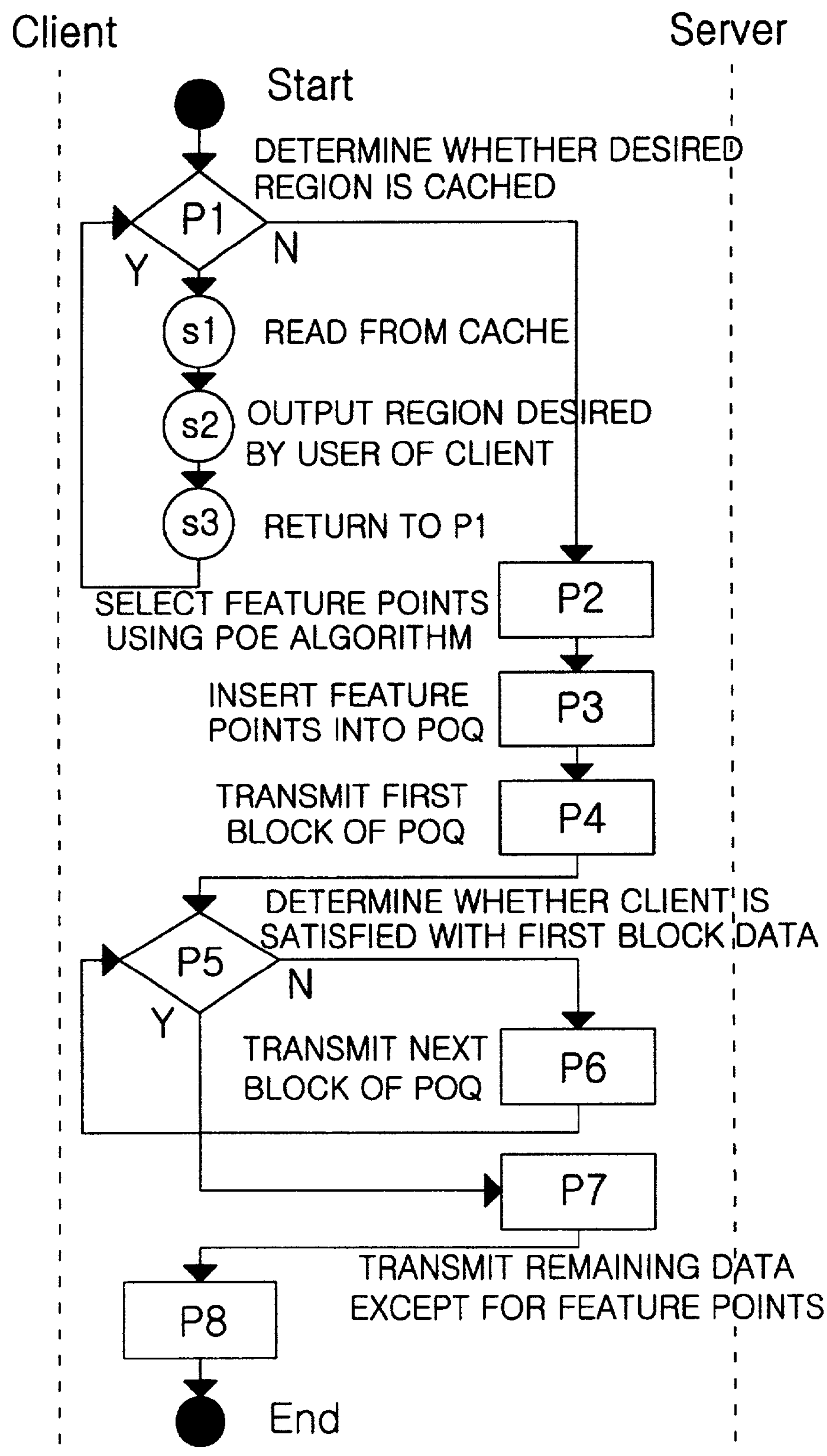
FIG. 5 is a flow chart illustrating an example of the operation of the progressive transmission processor of FIG. 1.

As shown in FIG. 5, the progressive transmission processor 70 determines whether a desired region is cached before transmitting the result (vector data) processed by each GIS server to the client. If the desired region is in a cache, the progressive transmission processor 70 reads the desired region from the cache (not shown), outputs the region, and then repeats above step. On the other hand, if the desired region is not cached, the progressive transmission processor 70 selects feature points using a priority order estimation (POE) algorithm, inserts the feature points into a priority order queue (POQ), and then transmits a first POQ block to the client. Then, the progressive transmission processor 70 determines whether the client is satisfied with the transmitted first block of data. If the client is not satisfied with the transmitted data, the progressive transmission processor 70 transmits a next POQ block and determines again whether the client is satisfied with the next block of data. According to the determination result, if the client is satisfied with the block of data, the progressive transmission processor 70 transmits the remaining data excluding the feature points.

The above process is described in the following example.

Figure 6:
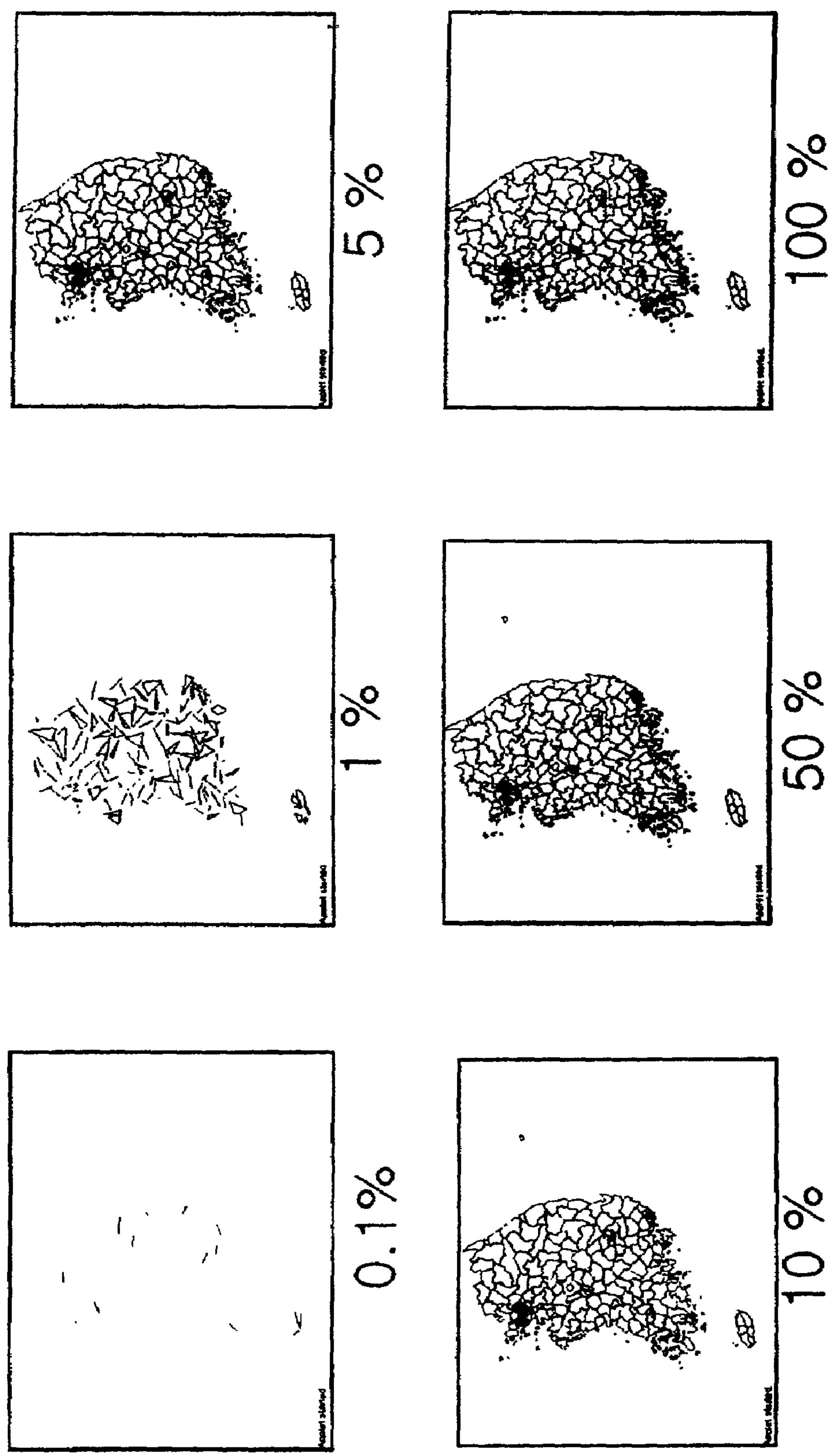
FIG. 6 is a set of diagrams illustrating examples of progressive transmission processing stages according to the present invention.

As shown in FIG. 6, result objects processed by the GIS servers 40 are assigned priorities by the POE algorithm and are inserted into the POQ. Therefore, an object with the highest priority is first transmitted to the client, and the remainders are sequentially transmitted, thus completing the transmission of all of the objects. In this case, all or parts of the objects are transmitted according to whether the client already has partial data (that is, whether the partial data is cached).

As described above, the present invention provides a vector-based, clustering Web geographic information system and a control method thereof, which can improve the stability and reliability of a service providing vector-based Web geographical information by preventing a server from being down due to an unexpected increase of the number of users, while maintaining a comparable quality of function with respect to a raster-based service in terms of processing speed by minimizing a user response time while providing various analyzing functions to a client by transmitting vector data to the client.

Although the preferred embodiments of the present invention have been disclosed for illustrative purposes, those skilled in the art will appreciate that various modifications, additions, and substitutions are possible without departing from the scope and spirit of the invention as disclosed in the accompanying claims.

What is claimed is:

1. A vector-based, clustering Web geographic information system (GIS), comprising:

at least one client for downloading a Web page through a Web browser, receiving vector data as a result by communicating with a corresponding process like a control server or an applet server via HTTP, and displaying the received vector data;

a Web server for receiving spatial queries from an object downloaded to the client;

a load balancing processor for receiving the spatial queries from the Web server, partitioning a complete region into uniform, tile-based regions using spatial locality, assigning the partitioned regions to respective GIS servers, allowing one GIS server to process queries for a certain region, and dynamically reallocating GIS servers for processing the queries by checking query processing regions and query processing frequencies of respective GIS servers so as to prevent the concentration of queries on one GIS server;

a progressive transmission processor for extracting feature points of respective objects in vector data received from GIS servers, transmitting the extracted features to the client through the Web server, so as to minimize a user response time, and then transmitting the vector data;

a clustering device for improving performance by dividing service requests from the clients among GIS servers;

a plurality of GIS servers each having a GIS engine, for processing the spatial queries received from the load balancing processor, producing and transmitting vector data to the progressive transmission processor; and a spatial/non-spatial database for providing data to the GIS servers, managing complete data using tile based indexes, and constituting a local duplicate database in each GIS server to prevent central bottlenecking.

2. The vector-based, clustering Web geographic information system according to claim 1, wherein the progressive transmission processor constructs a priority order queue (POQ) so as to extract feature points and estimates priorities of the feature points using a priority order estimation (POE) algorithm.

3. The vector-based, clustering Web geographic information system according to claim 1, wherein the load balancing processor comprises:

a query region extractor for extracting a spatial operator, a layer, and a query region from a URL based query form requested from the client;

a spatial query dispatcher for classifying the spatial query transmitted from the query region extractor using a query class table, determining a GIS server for processing the spatial query on the basis of tiles, which correspond to query regions, and then transmitting the query;

a statistical information managing device for managing meta-information for calculating a load concentration rate for each GIS server;

a query processing region partitioner for separately performing a static partitioning operation of partitioning complete map data into a plurality of tiles, calculating Hilbert values for the partitioned tiles, sorting the tiles according to the Hilbert values, and then dividing the sorted tiles by the number of GIS servers, and a dynamic partitioning operation of calculating a weight rate based on a region managed by each GIS server and the number of real query processing times, and reestablishing partitioned regions if the weight rate is greater than or equal to a predetermined percentage; and a query request redirector for receiving the query and an address of the determined server from the spatial query dispatcher, and transmitting the query to the determined GIS server.

4. The vector based clustering Web geographic information system according to claim 3, wherein the meta-information of the statistical information managing device contains regions of tiles assigned to respective GIS servers, query processing rates, and weights of the tiles.

5. A control method of a vector-based, clustering Web geographic information system (GIS), comprising steps of:

(a) downloading a Web page through a Web browser, running a map service process like a control(GeoWebx) or an applet(GeoApplete), and transmitting a spatial query to a Web server;

(b) transferring the query to a load balancing processor and allowing the load balancing processor to transfer the query to a GIS server selected by a predetermined process;

(c) processing the query and transmitting the processed result of vector data to a progressive transmission processor by the selected GIS server; and (d) extracting feature points of respective objects in the result and transmitting the extracted feature points to the client through a predetermined progressive transmission process so as to minimize a user response time, before transmitting the result to the client.

6. The control method of a vector-based, clustering Web geographic information system according to claim 5, wherein the predetermined process of said step (b) comprises steps of:

(b1) partitioning a complete map data into units of tiles and constructing tile indexes;

(b2) calculating Hilbert values of respective tiles, mapping the Hilbert values into tiles one-dimensionally, sorting the mapped tiles, dividing the sorted tiles by the number of GIS servers, and constructing a mapping table;

(b3) obtaining a tile corresponding to a region of the query received from the Web server;

(b4) selecting a GIS server which is processing a query for a region adjacent the query region among GIS servers;

(b5) reading a load balancing meta table, and determining whether the number of query processing times of the GIS server selected by load balancing meta-information is greater than or equal to a predetermined percentage;

(b6) reestablishing query regions of the respective GIS servers if the number of query processing times is greater than or equal to the predetermined percentage and repeating from said step (b4); and (b7) transmitting the query to the selected GIS server if the number of query processing times is less than the predetermined percentage.

7. The control method of a vector based clustering Web geographic information system according to claim 5, wherein the predetermined progressive transmission process of said step (d) comprises steps of:

(d1) determining whether a region requested by the client is cached;

(d2) reading and outputting the region from a cache, and repeating from said step (d1), if the region is cached;

(d3) selecting feature points using a priority order estimation algorithm (POE), inserting the selected feature points into a priority order queue (POQ), and then transmitting a first block of the POQ to the client, if the region is not cached;

(d4) determining whether the client is satisfied with the first block data; and (d5) transmitting a next block of the POQ and determining again whether the client is satisfied with the next block data, if the client is not satisfied with the first block data, and transmitting remaining data excluding the feature points to the client, if the client is satisfied with the block data.

* * * * *